(12) United States Patent
Nakielski et al.

(10) Patent No.: US 12,195,106 B2
(45) Date of Patent: Jan. 14, 2025

(54) PINION ELECTRIC POWER STEERING SYSTEM

(71) Applicant: Steering Solutions IP Holding Corporation, Saginaw, MI (US)

(72) Inventors: Marcin Jan Nakielski, Sosnowiec (PL); Grzegorz Piwowarski, Slask (PL); Mateusz Cielniak, Slask (PL); Jaroslaw Bujak, Malopolska (PL); Michael J. Augustine, Mayville, MI (US); Kevin P. Douglas, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 53 days.

(21) Appl. No.: 17/212,794

(22) Filed: Mar. 25, 2021

(65) Prior Publication Data

US 2021/0300461 A1    Sep. 30, 2021

Related U.S. Application Data

(60) Provisional application No. 62/994,464, filed on Mar. 25, 2020.

(51) Int. Cl.
*B62D 5/04* (2006.01)
*B62D 3/12* (2006.01)

(52) U.S. Cl.
CPC .......... *B62D 5/0421* (2013.01); *B62D 3/126* (2013.01); *B62D 5/0403* (2013.01)

(58) Field of Classification Search
CPC ..... B62D 5/0421; B62D 3/126; B62D 5/0403
See application file for complete search history.

(56) References Cited

U.S. PATENT DOCUMENTS

| | | | |
|---|---|---|---|
| 2002/0063012 A1* | 5/2002 | Katou | B62D 6/00 180/408 |
| 2016/0167697 A1* | 6/2016 | Minami | F16D 3/06 74/89.17 |
| 2020/0047792 A1* | 2/2020 | Washnock | B62D 3/123 |

FOREIGN PATENT DOCUMENTS

| | | | | |
|---|---|---|---|---|
| DE | 102010027553 A1 | * | 1/2012 | ............. B62D 3/12 |
| EP | 931714 A1 | * | 7/1999 | .......... B62D 5/0421 |
| EP | 3018034 A1 | * | 5/2016 | ............. B62D 3/12 |
| JP | 2011121103 A | * | 6/2011 | ............. B21K 1/767 |
| WO | WO-2015062739 A1 | * | 5/2015 | ............. B62D 3/12 |

* cited by examiner

*Primary Examiner* — Jacob D Knutson
(74) *Attorney, Agent, or Firm* — Dickinson Wright PLLC

(57) ABSTRACT

A rack electric power steering system includes a rack having a single set of teeth with a constant tooth pitch. The system also includes a first pinion operatively coupled to a steering shaft and in meshed engagement with the single set of teeth of the rack. The system further includes a second pinion operatively coupled to an electric motor and in meshed engagement with the single set of teeth of the rack.

6 Claims, 4 Drawing Sheets

PINION ELECTRIC POWER STEERING SYSTEM

CROSS-REFERENCE TO RELATED APPLICATION

This patent application claims the benefit of priority to U.S. Provisional Patent Application Ser. No. 62/994,464, filed Mar. 25, 2020, the disclosure of which is incorporated by reference herein in its entirety.

FIELD OF THE INVENTION

The present disclosure relates to vehicle steering systems and, more particularly, to a dual pinion electric power steering system.

BACKGROUND

Various electric power steering (EPS) systems have been developed for assisting an operator with vehicle steering. One type of EPS system is referred to as a rack electric power steering (REPS) system. A REPS system utilizes an electric motor that drives an assist pinion having teeth engaged with a rack. In a dual pinion REPS system, the assist pinion complements a driving pinion that is rotated in response to rotation of a portion of the steering column by an operator. In such systems, each pinion is engaged with a respective, distinct set of teeth on the rack. In particular, the assist pinion is in meshed engagement with an assist set of teeth on the rack and the driving pinion is in meshed engagement with a driving set of teeth on the rack. The assist set of teeth and the driving set of teeth have respective pitches that may differ from each other to satisfy desired operation for each pinion. This complicates manufacturing of the rack. Additionally, the above-described systems pose packaging challenges due to the need for a separate assist mechanism housing on an opposite side of driver pinion.

SUMMARY

According to one aspect of the disclosure, a rack electric power steering system includes a rack having a single set of teeth with a constant tooth pitch. The system also includes a first pinion operatively coupled to a steering shaft and in meshed engagement with the single set of teeth of the rack. The system further includes a second pinion operatively coupled to an electric motor and in meshed engagement with the single set of teeth of the rack.

According to another aspect of the disclosure, a rack electric power steering system includes a rack having a plurality of teeth formed thereon. The system also includes a first pinion operatively coupled to a steering shaft and in meshed engagement with the plurality of teeth of the rack. The system further includes a second pinion operatively coupled to an electric motor and in meshed engagement with the plurality of teeth of the rack, wherein the first pinion and the second pinion have at least one different structural parameter.

According to yet another aspect of the disclosure, a rack electric power steering system includes a rack having a plurality of teeth formed thereon. The system also includes a first pinion operatively coupled to a steering shaft and in meshed engagement with the plurality of teeth of the rack. The system further includes a second pinion operatively coupled to an electric motor and in meshed engagement with the plurality of teeth of the rack, wherein the first pinion extends longitudinally about a first axis and the second pinion extends longitudinally about a second axis, wherein the first axis and the second axis are not parallel to each other.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
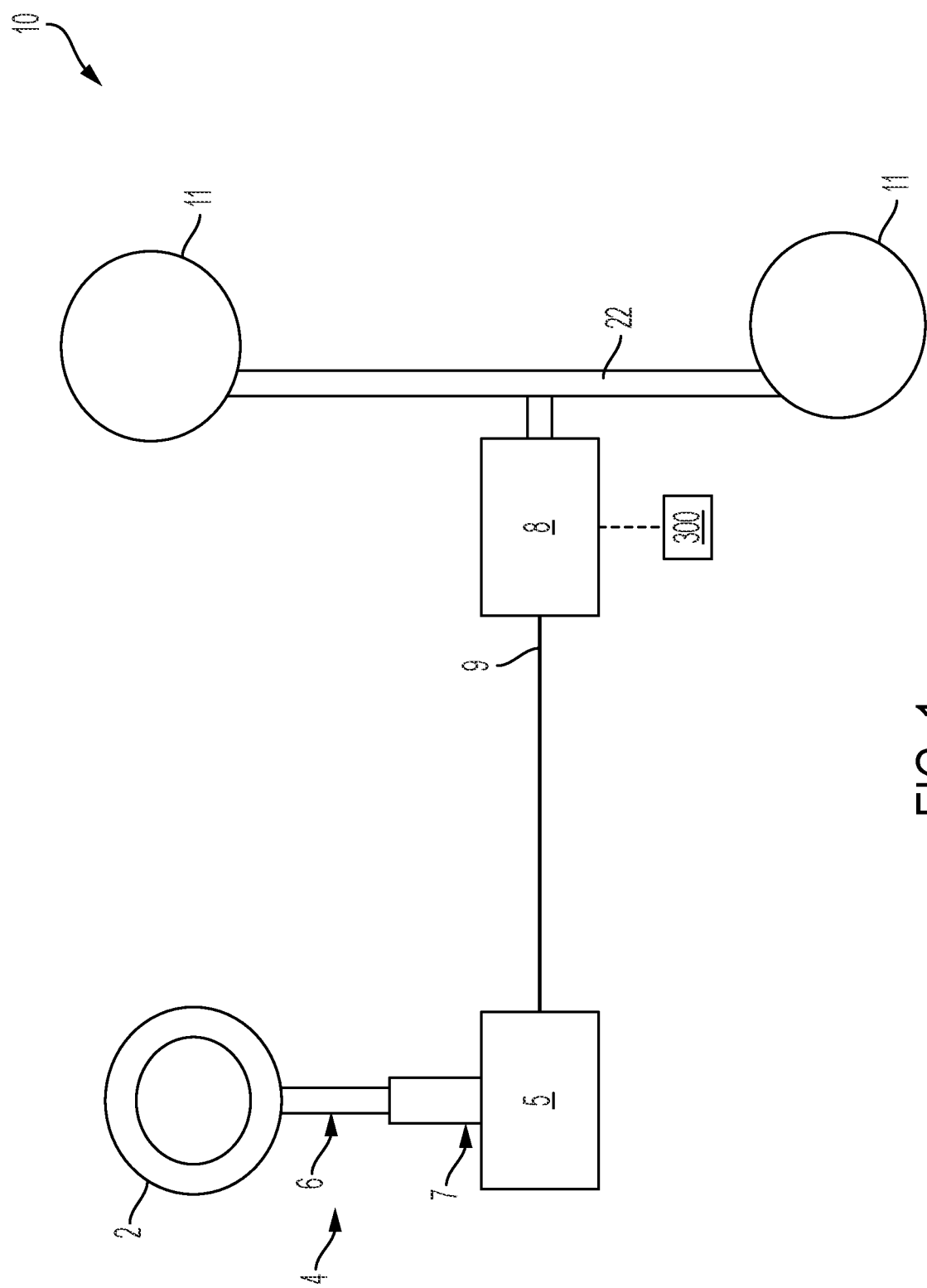
FIG. 1 is a schematic illustration of a rack electric power steering system.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or any other suitable vehicle, includes one of various steering system schemes. For example, steer-by-wire (SbW) and driver interface steering may be employed. Often, these various steering schemes include an electric power steering (EPS) system including components such as a steering wheel, a column, a rack-pinion gear, and/or an electric motor actuator, etc. The EPS system helps the operator steer a vehicle by providing desirable assist torque. The assist torque is based on an operator's applied torque. In a steady-state sense, the operator torque and assist torque counter the rack force generated because of tire-road interaction.

Although existing solutions have provided a certain amount of workability, improvements in power steering system design and adaptability continue to be of interest. Accordingly, systems and methods, such as those described herein, configured to provide improved packaging and operational framework of a power steering system, may be desirable. In some embodiments, the systems and methods described herein may be configured to provide improvements to the operational framework of the power steering system and to improve the manufacturing and assembly processes associated with the overall system.

Referring now to the drawings, where the various embodiments are shown and described herein, without limiting same, illustrated are embodiments of a system, method and apparatus for the power steering system that permits assembly in multiple arrangements, which result in improved packaging and other operational benefits.

Referring initially to FIG. 1, the power steering system 10 is generally illustrated. The power steering system 10 may be configured as a driver interface steering system, an autonomous driving system, or a system that allows for both driver interface and autonomous steering. The steering system may include an input device 2, such as a steering wheel or other HWAs, wherein a driver may mechanically provide a steering input by turning the steering wheel. A steering column 4 extends along an axis from the input device 2 to an output assembly 5. The steering column 4 may include at least two axially adjustable parts, for example, a first portion 6 and a second portion 7 that are axially adjustable with respect to one another. The output assembly 5 may include a pinion shaft assembly, an I-shaft, a cardan joint, steer-by-wire components or any other features conventionally located opposite the input device 2. The output assembly 5 may connect to a power-assist assembly 8 (RWA) via a connection 9. The connection 9 may be one of a steering gear input shaft, a continuation of the pinion shaft assembly, or wired or wireless digital communication protocols. As will be described in greater detail below, behavior of the power-assist assembly 8 may be controlled via a control system 300.

Figure 2:
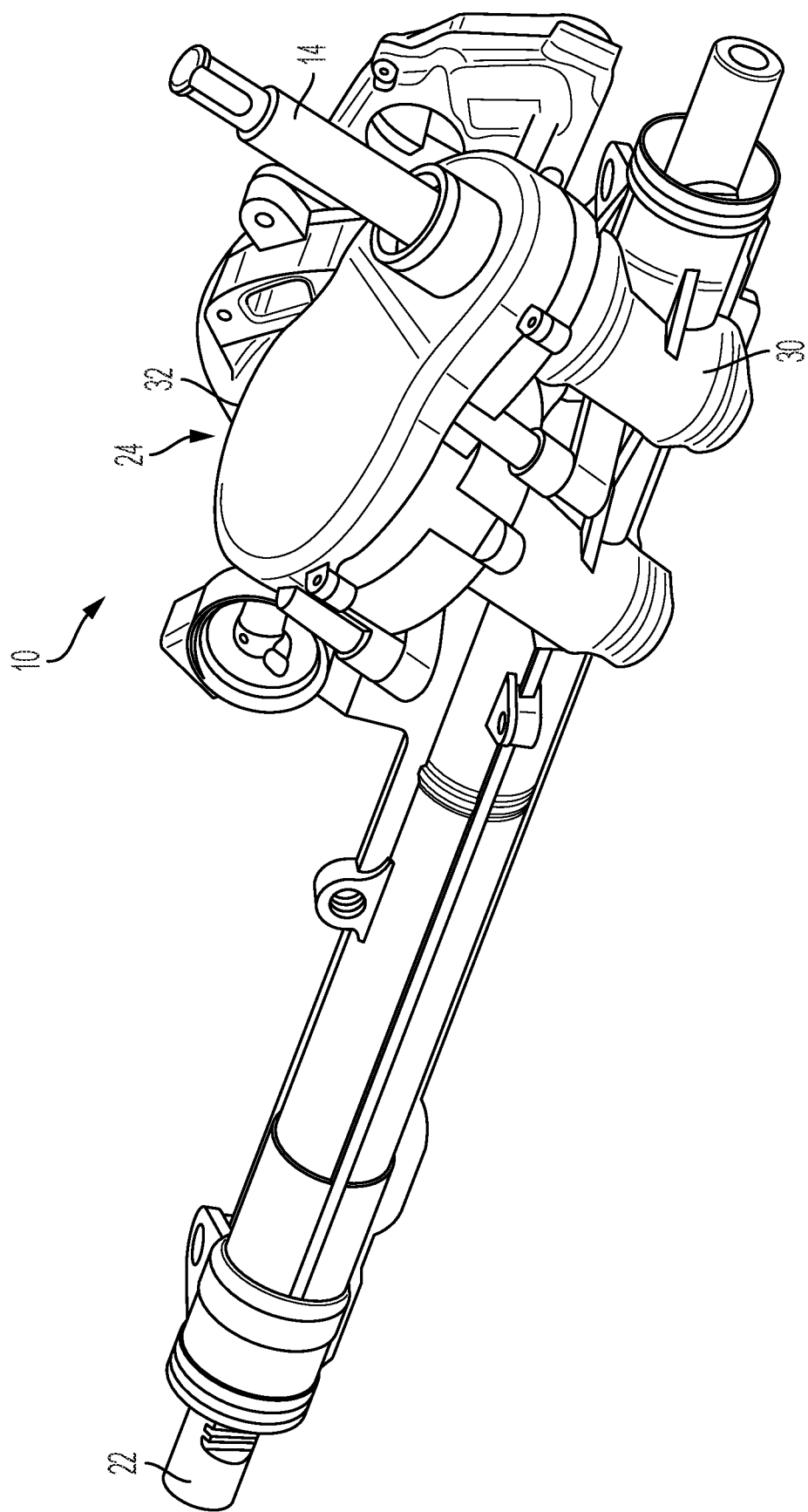
FIG. 2 is a perspective view of a rack electric power steering system.
Figure 3:
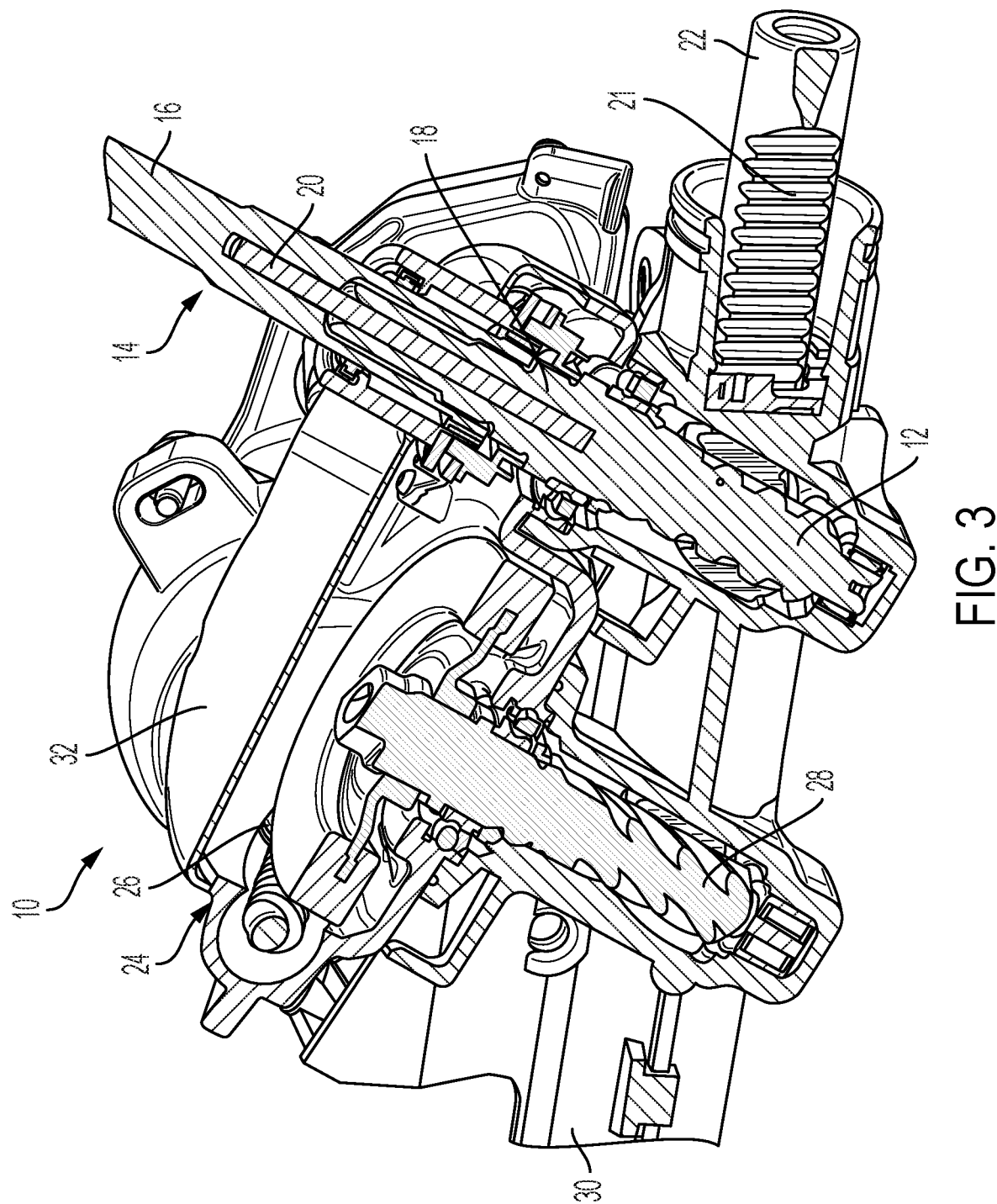
FIG. 3 is a sectional view of the rack electric power steering system.

FIGS. 2 and 3 illustrate the power steering system 10 in more detail. The power steering system 10 is also referred to herein as a pinion electric power steering (PEPS) system 10. The PEPS system 10 includes a driving pinion 12 that is operatively coupled to a steering shaft assembly 14. The driving pinion 12 rotates in direct response to a steering input by an operator of the vehicle. In the illustrated embodiment, the steering shaft assembly 14 includes an upper shaft 16 that is coupled to a lower shaft 18 with a torsion bar 20. In some embodiments, an intermediate shaft may also be included. In the illustrated embodiment, the driving pinion 12 is rotated in response to corresponding rotation of the lower shaft 18.

The driving pinion 12 is in meshed engagement with a set of teeth 21 formed on the rack 22. The rack 22 is coupled proximate its ends to various other steering components that convert translation of the rack 22 to angled movement of the wheels 11 of a vehicle to control the direction of the vehicle (FIG. 1).

To assist with steering control of the vehicle, an assist mechanism 24 is provided. The assist mechanism 24 includes an electric motor 26 that receives input from the controller 300 (FIG. 1) and actuates rotation of an assist pinion 28. The assist pinion 28 is in meshed engagement with the teeth 21 of the rack 22. Rotation of the assist pinion 28 results in an assist force on the rack 22 that reduces the effort required by the operator and may provide feedback to the driver in response to steering maneuvers.

As shown in FIG. 3, the rack 22 is located within a rack housing 30. The rack housing 30 is located adjacent to an assist mechanism housing 32. The rack housing 30 at least partially houses the driving pinion 12 and the assist pinion 28. The assist pinion 28 extends from the electric motor 26, which is housed within the assist mechanism housing 32, or may be driven indirectly with an intermediate component. The steering shaft assembly 14 also extends through the assist mechanism housing 32. In other words, packaging is improved upon when compared to systems that require a separate assist mechanism housing on an opposite side of the driving pinion, or anywhere else.

Figure 4:
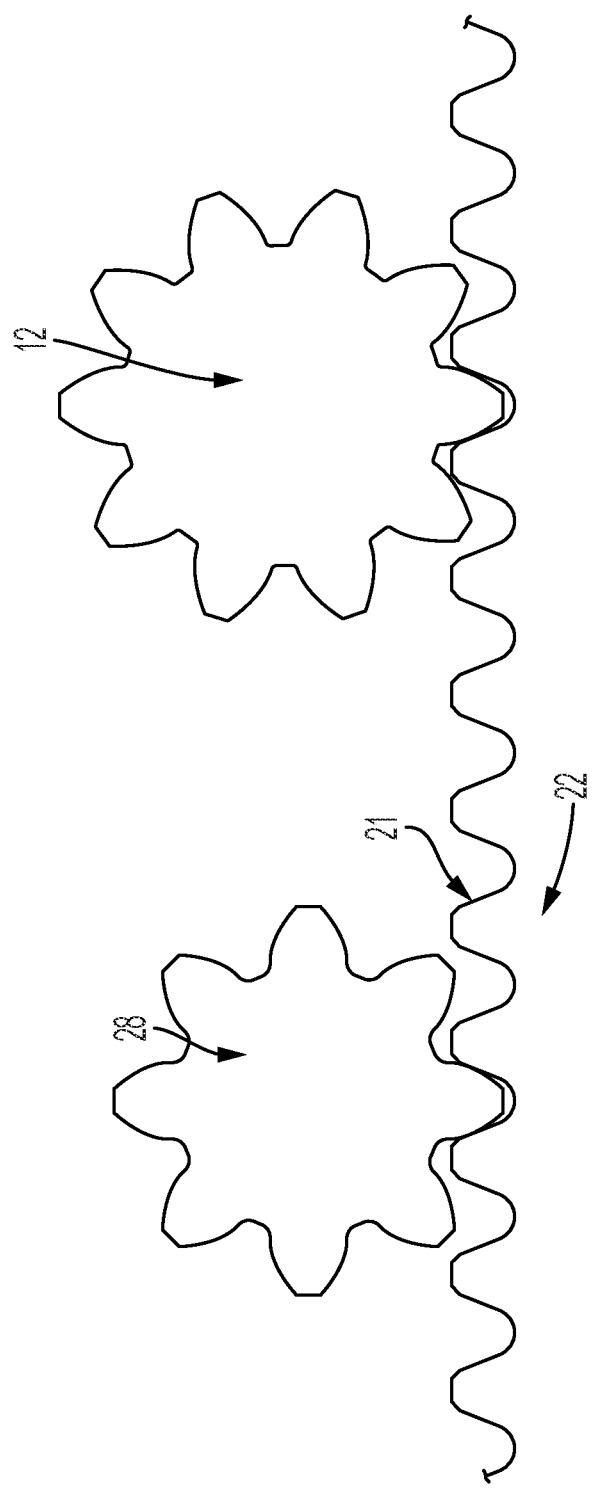
FIG. 4 is an elevational view of two pinions engaged with a rack of the rack electric power steering system.

Referring to FIG. 4, the driving pinion 12 and the assist pinion 28 are shown in greater detail. In particular, the relationship between the pinions 12, 28 and the rack 22 is illustrated. The rack 22 has the single set of teeth 21, with the teeth having substantially identical design parameters (i.e., within manufacturing tolerances and variability), such as a constant pitch and geometry along the entire length of the set of teeth 21 that are to be engaged by the pinions 12, 28. Therefore, the pinions 12, 28 engage the same set of teeth 21 (e.g., same pitch and geometry). Pinions 12, 28 may exhibit different gear tooth parameters or be identical provided each pinion's tooth parameters are consistent with proper engagement with the rack. Although certain advantages related to manufacturing and assembly and overall size can be realized by maintaining the pinion axes as parallel, it is entirely permissible that these axes be non-parallel with no loss of function. Any pinions that interface with the rack form in a proper kinematic relationship may be used. Primary parameters that may vary are number of teeth and angle of the pinion axis to the rack. All other pinion parameters, such as pressure angle, helix angle, major and minor diameters, tooth thickness, addendum, dedendum, face width and center distance are determined by the mating rack tooth parameters in consideration of proper gear function as would be known to those skilled in the art of gear design.

In the illustrated example, the assist pinion 28 has fewer teeth than the driving pinion 12. The reverse situation may also be true in other embodiments. It should be noted that structural characteristics of the teeth themselves may serve as the structural distinction in some embodiments. By providing different numbers of teeth, the pinions 12, 28 rotate at different speeds. Therefore, the driving pinion 12 maintains a ratio desired by a customer, while the assist pinion 28 provides a maximized output. However, it is to be understood that any single pinion parameter may be the structural difference between the two pinions 12, 28, or any combination of multiple pinion parameters may be the structural difference between the pinions 12, 28. Pinions 12 and 28 may share identical tooth parameters, if desired.

The embodiments disclosed herein provide reduced cost and complexity, as well as improved packaging. By keeping a rack teeth set common for both pinions 12, 28, requirements associated with customer ratio and maximized output is assured. This is distinct from variable ratio racks with varying tooth pitch to accommodate substantially identical pinions. The embodiments disclosed herein optimize packaging, as there is no need for a separate assist mechanism housing on an opposite side of driving pinion 12. The compact design is manufacturing friendly and is possible to assemble with less complex machines (also smaller machines).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rack electric power steering system comprising:
  a rack having a single set of teeth with a constant tooth pitch;

a first pinion operatively coupled to a steering shaft and in meshed engagement with the single set of teeth of the rack;

a second pinion operatively coupled to an electric motor and in meshed engagement with the single set of teeth of the rack, wherein the first pinion and the second pinion have at least one different structural parameter, wherein the first pinion and the second pinion share a common normal pitch and reference pressure angle with the rack, wherein the at least one different structural parameter is number of pinion teeth, wherein the first pinion and the second pinion are located within a common rack housing; and an assist housing, wherein the electric motor is at least partially disposed within the assist housing, wherein the steering shaft extends through the assist housing.

2. The rack electric power steering system of claim 1, wherein the first pinion has more pinion teeth than the second pinion.

3. The rack electric power steering system of claim 1, wherein the first pinion has fewer pinion teeth than the second pinion.

4. The rack electric power steering system of claim 1, wherein the at least one different structural parameter is tooth geometry.

5. The rack electric power steering system of claim 1, wherein the at least one different structural parameter is at least one of: helix angle, major and minor diameters, tooth thickness, addendum, dedendum, and face width.

6. The rack electric power steering system of claim 1, wherein the assist housing is located adjacent to the common rack housing.

\* \* \* \* \*